United States Patent
Xu (10) Patent No.: US 10,225,310 B2
(45) Date of Patent: Mar. 5, 2019

(54) TRANSMISSION PROCESSING METHODS AND APPARATUSES OF DATA PACKET

(71) Applicant: ZTE Corporation, Shenzhen (CN)

(72) Inventor: Hui Xu, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 3 days.

(21) Appl. No.: 15/505,430

(22) PCT Filed: Jan. 13, 2015

(86) PCT No.: PCT/CN2015/070636
§ 371 (c)(1),
(2) Date: Feb. 21, 2017

(87) PCT Pub. No.: WO2015/154557
PCT Pub. Date: Oct. 15, 2015

(65) Prior Publication Data
US 2017/0272493 A1  Sep. 21, 2017

(30) Foreign Application Priority Data

Aug. 21, 2014 (CN) .......................... 2014 1 0416491

(51) Int. Cl.
*H04L 29/06* (2006.01)
*H04W 28/06* (2009.01)
(Continued)

(52) U.S. Cl.
CPC .......... *H04L 65/608* (2013.01); *H04L 65/607* (2013.01); *H04L 65/80* (2013.01);
(Continued)

(58) Field of Classification Search
CPC . H04L 65/608; H04L 2212/00; H04L 1/0006; H04L 65/607; H04L 69/161;
(Continued)

(56) References Cited

U.S. PATENT DOCUMENTS 7,836,124 B2    11/2010   Saxena
2008/0117906 A1*  5/2008  Xie .................. H04L 65/608
                                                  370/392
(Continued)

FOREIGN PATENT DOCUMENTS

| CN | 101005448 A | 7/2007 |
|----|-------------|--------|
| CN | 101094162 A | 12/2007 |
| EP | 1868342 A1  | 12/2007 |

OTHER PUBLICATIONS

International Search Report for corresponding application No. PCT/CN2015/070636 filed on Jan. 13, 2015; dated May 29, 2015.
(Continued)

*Primary Examiner* — Jung Liu
(74) *Attorney, Agent, or Firm* — Cantor Colburn LLP (57) ABSTRACT

Transmission processing methods and apparatuses of a data packet are provided. A User equipment (UE) carries out the following processing for media plane data to be sent: calling a Real-time Transport Protocol (RTP) stack to encapsulate the media plane data to obtain an initial RTP packet, and prohibiting calling an Internet Protocol (IP)/User Data Protocol (UDP) stack for encapsulating the initial RTP packet; and sending the processed media plane data to a base station.

20 Claims, 6 Drawing Sheets

(51) Int. Cl.
*H04N 21/8547* (2011.01)
*H04W 80/12* (2009.01)

(52) U.S. Cl.
CPC ........... *H04L 69/161* (2013.01); *H04W 28/06* (2013.01); *H04L 2212/00* (2013.01); *H04N 21/8547* (2013.01); *H04W 80/12* (2013.01)

(58) Field of Classification Search
CPC ...... H04L 65/80; H04W 28/06; H04W 80/12; H04N 21/8547
See application file for complete search history.

(56) References Cited

U.S. PATENT DOCUMENTS

| 2012/0147860 | A1* | 6/2012 | Ramesh | H04L 65/605 370/336 |
| 2012/0163184 | A1* | 6/2012 | Choi | H04L 65/1016 370/241 |
| 2012/0218942 | A1 | 8/2012 | Lu et al. | |
| 2013/0322331 | A1* | 12/2013 | Ramkumar | H04W 28/10 370/328 |
| 2014/0241243 | A1* | 8/2014 | Singh | H04L 1/08 370/328 |
| 2015/0263931 | A1* | 9/2015 | Hinkle | H04L 45/02 370/254 |
| 2015/0373774 | A1* | 12/2015 | Belghoul | H04W 76/048 370/252 |
| 2016/0379658 | A1* | 12/2016 | Bruhn | H04L 65/607 370/476 |
| 2017/0103770 | A1* | 4/2017 | Frankkila | G10L 19/167 |

OTHER PUBLICATIONS

Supplemental European Search Report dated May 15, 2017 re: Application No. EP 15 77 6055, pp. 1-8, citing: EP 1 868 342 A1 and US 2012/218942 A1.

* cited by examiner

ND APPARATUSES OF DATA PACKET

TRANSMISSION PROCESSING METHODS AND APPARATUSES OF DATA PACKET

TECHNICAL FIELD

The present disclosure relates to the field of communications, and in particular to transmission processing methods and apparatuses of a data packet.

BACKGROUND

Figure 1:
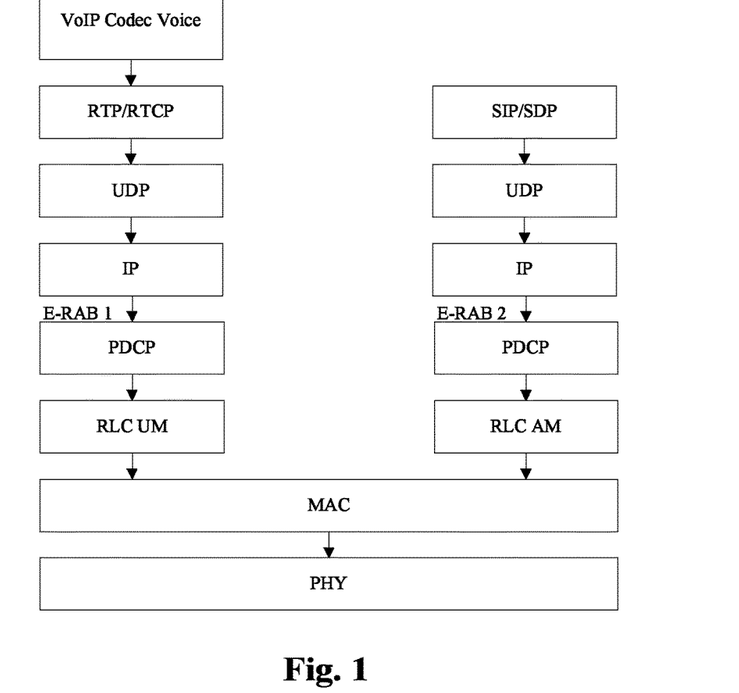
FIG. 1 is a diagram illustrating a protocol stack of VoLTE.

FIG. 1 is a diagram illustrating the structure of a protocol stack of Voice over LTE (VoLTE). As shown in FIG. 1, an application layer first encodes voice data and then sequentially calls a Real-time Transport Protocol (RTP) to generate an RTP packet and a Transmission Control Protocol (TCP) stack or an Internet Protocol (IP) stack to encapsulate a User Data Protocol (UDP)/IP header, to finally generate a general VoIP packet. There are various layer 2 VoIP-bearing protocols, for example, if the second layer of the widely used Ethernet is a Long-Term Evolution (LTE) network, then the Ethernet is called a VoLTE.

The length of VoIP voice data is generally small, averagely more than ten but less than twenty bytes. The length of the mainstream Adaptive Multi-Rate (AMR) audio encoding ranges from 13 bytes to 32 bytes. However, an RTP/UDP/IP header occupies 40 bytes or even more (for example, the length of an RTP/UDP/IP header is 60 bytes in IPv6), thus, the bandwidth utilization rate of an air interface is low, generally, 20%, during the radio link transmission of VoIP.

Air interface resources for wireless transmission are limited and precious. In order to increase the percentage of payload to save the bandwidth of air interfaces, Robust Header Compression (ROHC) is generally started, when VoLTE media plane data is transmitted between a UE and a base station, to compress the length of the protocol header.

The feature of LTE trunking group calls lies in that numerous listening users only have downlink data (similar to multicast), only a Unidirectional (U) mode without any feedback path is available if ROHC is started, in the U mode, a complete RTP/UDP/IP header should be sent periodically in order to ensure the synchronization of the receiver, however, the synchronization effect of the receiver cannot be ensured. Due to the frequent sending of complete headers, this technical solution has poor compression effect, and contrary to the expectation, the receiver may fail in decompression because of the change of a radio link.

No effective solutions have been proposed to address the problem existing in the related art that it is impossible to save air interface resources for transmitting media plane data between a user equipment and a base station and synchronously achieve disorder adjustment and voice-video synchronization of media plane data.

SUMMARY

Embodiments of the present disclosure provide transmission processing methods and apparatuses of a data packet to at least address the problem existing in the related art that it is impossible to save air interface resources for transmitting media plane data between a user equipment and a base station and synchronously achieve disorder adjustment and voice-video synchronization of media plane data.

In accordance with an embodiment of the present disclosure, a transmission processing method of a data packet is provided which includes the following steps that: a UE carries out the following processing for media plane data to be sent: calling a Real-time Transport Protocol (RTP) stack to encapsulate the media plane data to obtain an initial RTP packet, and prohibiting calling an IP/UDP stack for encapsulating the initial RTP packet; and the UE sends the processed media plane data to a base station.

In an exemplary embodiment, before the UE sends the processed media plane data to the base station, the method may further include: calling an LTE protocol stack to encapsulate the RTP packet by adding a Packet Data Convergence Protocol (PDCP)/Radio Link Control (RLC)/Multiple Access Control (MAC) header to the RTP packet.

In accordance with another embodiment of the present disclosure, another transmission processing method of a data packet is provided which includes the following steps that: a base station receives media plane data from a UE, wherein the media plane data is data obtained by carrying out the following processing by the UE: calling an RTP stack to encapsulate media plane data to obtain an initial RTP packet; prohibiting calling an IP/UDP stack for encapsulating the RTP packet; and calling an LTE protocol stack to encapsulate the RTP packet again; the base station calls the LTE protocol stack to process the media plane data to obtain the initial RTP packet; the base station calls a GTPU/UDP/IP protocol to encapsulate the initial RTP packet; and the base station sends the encapsulated initial RTP packet to a core network.

In an exemplary embodiment, the step that the UE calls the LTE protocol stack to encapsulate the RTP packet again includes: calling the LTE protocol stack to encapsulate the RTP packet by adding a PDCP/RLC/MAC header to the RTP packet.

In an exemplary embodiment, the step that the base station calls the LTE protocol stack to process the media plane data to obtain the initial RTP packet includes that: the base station calls the LTE protocol stack to remove the MAC/RLC/PDCP header to obtain the initial RTP packet.

In accordance with another embodiment of the present disclosure, another transmission processing method of a data packet is provided which includes the following steps that: a base station receives a data packet from a core network; the base station calls an IP/UDP/GTPU stack to remove an IP/UDP/GTPU header; and the base station sends the data packet with the IP/UDP/GTPU header removed to a UE.

In an exemplary embodiment, before the base station sends the data packet with the IP/UDP/GTPU header removed to the UE, the method may further include the following step that: the base station calls an LTE protocol stack to encapsulate the data packet with the IP/UDP/GTPU header removed to obtain an encapsulated packet.

In an exemplary embodiment, the step that the base station calls the LTE protocol stack to encapsulate the packet includes that: the base station calls an MAC/RLC/PDCP stack to encapsulate the data packet with the IP/UDP/GTPU header removed.

In accordance with an embodiment of the present disclosure, a transmission processing apparatus of a data packet is provided. The transmission processing apparatus is applied to a UE and includes: a processing module arranged to carry out the following processing for media plane data to be sent: calling an RTP stack to encapsulate the media plane data to obtain an initial RTP packet, wherein the UE prohibits calling an IP/UDP stack for encapsulating the initial RTP packet; and a sending module arranged to send the processed media plane data to a base station.

In an exemplary embodiment, the apparatus may further include: an encapsulation module arranged to call an LTE protocol stack to encapsulate the RTP packet by adding a PDCP/RLC/MAC header to the RTP packet.

In accordance with an embodiment of the present disclosure, another transmission processing apparatus of the data packet is provided. The transmission processing apparatus is applied to a base station and includes: a receiving module arranged to receive media plane data from a UE, wherein the media plane data is data obtained by carrying out the following processing by the UE: calling an RTP stack to encapsulate media plane data to obtain an initial RTP packet; prohibiting calling an IP/UDP stack for encapsulating the initial RTP packet; and calling an LTE protocol stack to encapsulate the RTP packet again; a restoring module arranged to call the LTE protocol stack to process the media plane data to obtain the initial RTP packet; an encapsulation module arranged to call an IP/UDP protocol to encapsulate the initial RTP packet; and a sending module arranged to send the encapsulated initial RTP packet to a core network.

In accordance with another embodiment of the present disclosure, another transmission processing apparatus of the data packet is provided. The transmission processing apparatus is applied to a base station and includes: a receiving module arranged to receive a data packet from a core network; a removal module arranged to call an IP/UDP/GTPU stack to remove an IP/UDP/GTPU header; and a sending module arranged to send the data packet with the IP/UDP/GTPU header removed to a UE.

In an exemplary embodiment, the apparatus may further include an encapsulation module arranged to call an LTE protocol stack to encapsulate the data packet with the IP/UDP/GTPU header removed to obtain an encapsulated packet.

In an exemplary embodiment, the encapsulation module is arranged to call an MAC/RLC/PDCP stack to encapsulate the data packet with the IP/UDP/GTPU header removed.

By virtue of the technical solutions provided by the embodiments of the present disclosure, a UE carries out the following processing for media plane data to be sent: calling an RTP stack to encapsulate the media plane data to obtain an initial RTP packet; and prohibiting calling an IP/UDP stack for encapsulating the initial RTP packet; and the UE sends the processed media plane data to a base station. The transmission processing methods and apparatuses of the data packet provided herein address the problem existing in the related art that it is impossible to save air interface resources for transmitting media plane data between a user equipment and a base station and synchronously achieve disorder adjustment and voice-video synchronization of media plane data, thereby saving air interface resources and synchronously achieving disorder adjustment and voice-video synchronization of media plane data.

BRIEF DESCRIPTION OF THE DRAWINGS

The accompanying drawings described herein which are incorporated into and form a part of the application are provided for the better understanding of the present disclosure, and exemplary embodiments of the present disclosure and the description of the exemplary embodiments serve to illustrate the present but are not to be construed as improper limitations to the present disclosure. In the accompanying drawings.

DETAILED DESCRIPTION OF THE EMBODIMENTS

The present disclosure will be described below in detail with reference to accompanying drawings in conjunction with specific embodiments. It should be noted that the embodiments of the present disclosure and the features thereof can be combined with each other if no conflict is caused.

Figure 2:
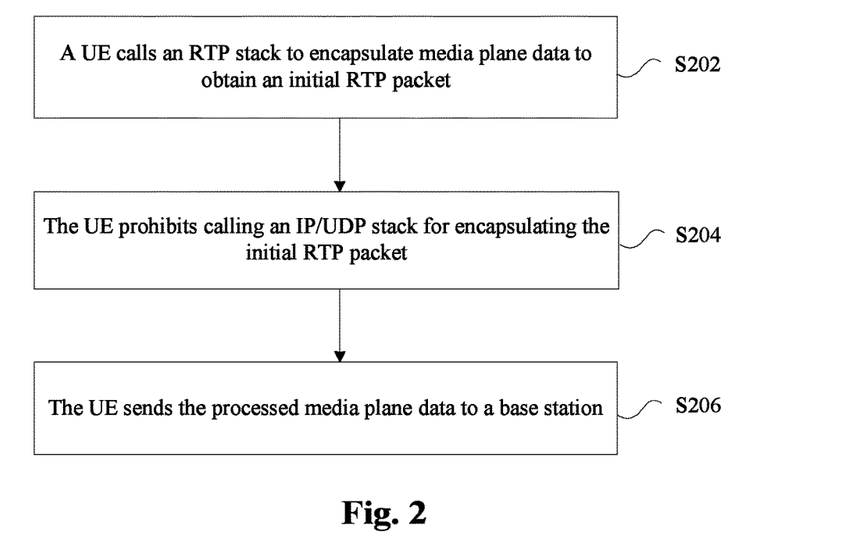
FIG. 2 is a flowchart 1 illustrating the flow of a transmission processing method of a data packet according to an embodiment of the present disclosure.

A transmission processing method of a data packet is provided in an embodiment. FIG. 2 is a flowchart 1 illustrating the flow of a transmission processing method of a data packet according to an embodiment of the present disclosure. As shown in FIG. 2, the flow includes the following steps:

S202: a UE calls an RTP stack to encapsulate media plane data to obtain an initial RTP packet;

S204: the UE prohibits calling an IP/UDP stack for encapsulating the initial RTP packet; and S206: the UE sends the processed media plane data to a base station.

In the foregoing steps, an UE firstly obtains an initial RTP packet by calling an RTP stack to encapsulate media plane data. By virtue of this step, an RTP header is kept so that disorder adjustment can be carried out for the media plane data using the sequence number field contained in the RTP header. Moreover, in the case of the coexistence of voice and video, the voice and the video can be synchronized with each other using the timestamp field contained in the RTP header. Afterwards, the UE prohibits calling an IP/UDP stack for encapsulating the RTP packet. For example, the UE directly removes the IP/UDP header of the media plane packet of an air interface. Then, the UE sends the processed media plane data to a base station. Because an IP/UDP header occupies long bytes in relevant arts, the foregoing steps, when compared with the related art, address the problem existing in the related art that it is impossible to save air interface resources for transmitting media plane data between a user equipment and a base station and synchronously achieve disorder adjustment and voice-video synchronization of media plane data, thereby saving air interface resources and synchronously achieving disorder adjustment and voice-video synchronization of media plane data. In an exemplary embodiment, before the UE sends the processed media plane data to the base station, the UE may call an LTE protocol stack to encapsulate the RTP packet. For example, the UE calls an LTE protocol stack to add a PDCP header, an RLC header and an MAC header respectively to the RTP packet.

Figure 3:
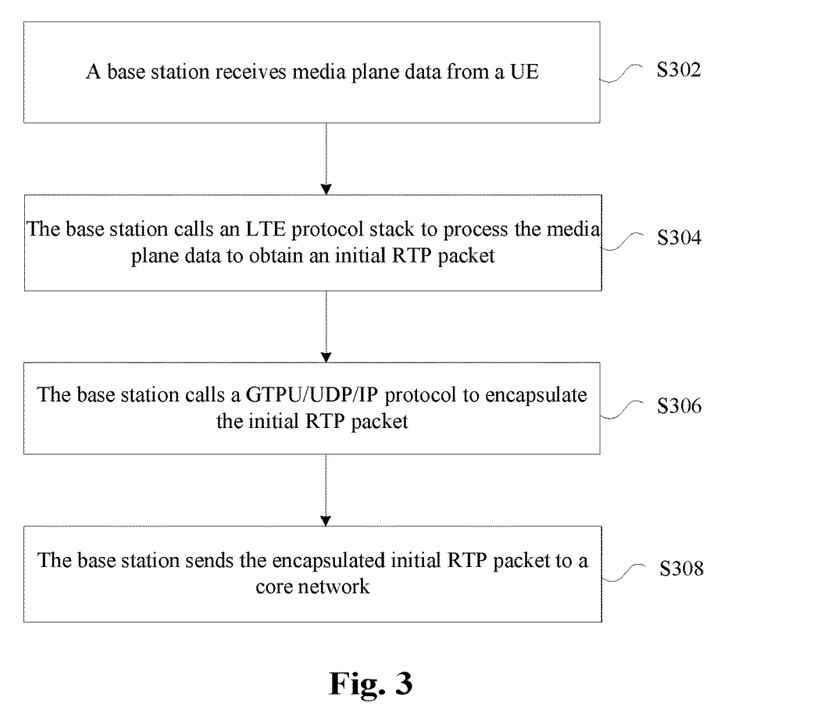
FIG. 3 is a flowchart 2 illustrating the flow of a transmission processing method of a data packet according to an embodiment of the present disclosure.

Another transmission processing method of a data packet is provided in an embodiment. FIG. 3 is a flowchart 2 illustrating the flow of a transmission processing method of a data packet according to an embodiment of the present disclosure. As shown in FIG. 3, the flow includes the following steps:

S302: a base station receives media plane data from a UE, wherein the media plane data is data obtained by carrying out the following processing by the UE: calling an RTP stack to encapsulate media plane data to obtain an initial RTP packet; prohibiting calling an IP/UDP stack for encapsulating the RTP packet; and calling an LTE protocol stack to encapsulate the RTP packet again;

S304: the base station calls the LTE protocol stack to process the media plane data to obtain the initial RTP packet;

S306: the base station calls a GTPU/UDP/IP protocol to encapsulate the initial RTP packet; and S308: the base station sends the encapsulated initial RTP packet to a core network.

In the foregoing steps, a base station calls a GTPU/UDP/IP stack to encapsulate an initial RTP packet received from a UE and sends the encapsulated RTP packet to a core network. Different from the related art in which a base station directly receives a media plane packet including an IP/UDP header from a UE, the transmission of a media plane packet including no IP/UDP header can be realized between a base station and a UE.

In an exemplary embodiment, the step that the UE calls the LTE protocol stack to encapsulate the RTP packet again includes that: the UE calls the LTE protocol stack to encapsulate the RTP packet by adding a PDCP/RLC/MAC header to the RTP packet.

In an exemplary embodiment, the step that the base station calls the LTE protocol stack to process the media plane data to obtain the initial RTP packet includes that: the base station calls the LTE protocol stack to remove the MAC/RLC/PDCP header to obtain the initial RTP packet.

Figure 4:
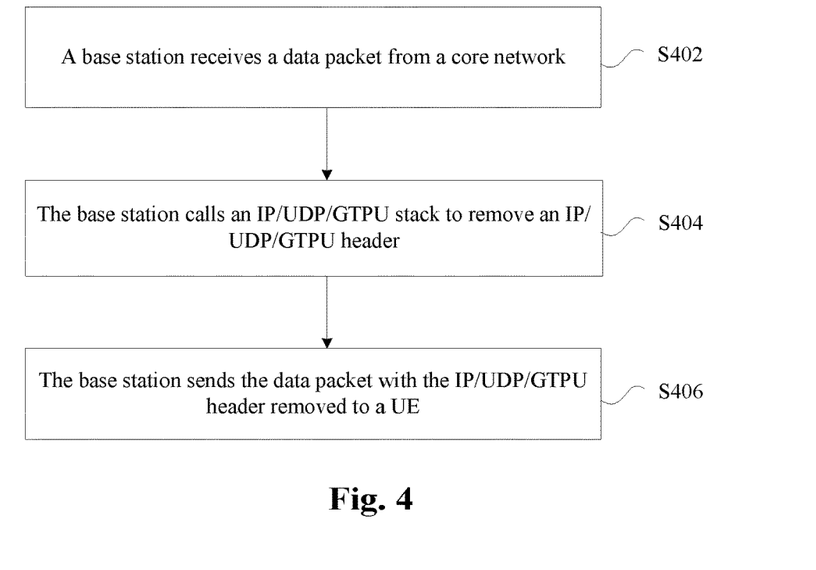
FIG. 4 is a flowchart 3 illustrating the flow of a transmission processing method of a data packet according to an embodiment of the present disclosure.

FIG. 4 is a flowchart 3 illustrating the flow of a transmission processing method of a data packet according to an embodiment of the present disclosure. As shown in FIG. 4, the flow includes the following steps:

S402: a base station receives a data packet from a core network;

S404: the base station calls an IP/UDP/GTPU stack to remove an IP/UDP/GTPU header; and S406: the base station sends the data packet with the IP/UDP/GTPU header removed to a UE.

In the foregoing steps, a base station sends a packet without IP/UDP/GTPU header to a UE. Compared with the related art in which an IP/UDP header occupies long bytes, the transmission processing method of the data packet provided in the embodiment addresses the problem existing in the related art that air interface resources are wasted when VoLTE media plane data is transmitted between a UE and a base station and consequentially achieves an effect of saving air interface resources.

In an exemplary embodiment, before sending the data packet with the IP/UDP/GTPU header removed to the UE, the base station calls an LTE protocol stack to encapsulate the data packet with the IP/UDP/GTPU header removed to obtain an encapsulated packet.

In another exemplary embodiment, the process that the base station calls the LTE protocol stack to encapsulate the data packet with the IP/UDP/GTPU header removed may be embodied as follows: the base station calls an MAC/RLC/PDCP stack to encapsulate the data packet with the IP/UDP/GTPU header removed.

A transmission processing apparatus of a data packet is also provided in an embodiment which is used to realize the foregoing embodiments and exemplary implementations, and what has been described above is not described here repeatedly. The term 'module', as used hereinafter, may be the combination of software and/or hardware for realizing preset functions. Although the apparatuses described in the following embodiments are implemented as software preferably, the implementation of the apparatuses as hardware or the combination of software and hardware may also be devised.

Figure 5:
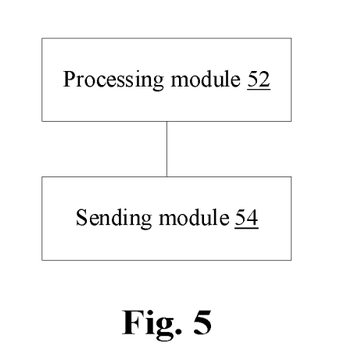
FIG. 5 is a block diagram 1 illustrating the structure of a transmission processing apparatus of a data packet according to an embodiment of the present disclosure.

FIG. 5 is a block diagram 1 illustrating the structure of a transmission processing apparatus of a data packet according to an embodiment of the present disclosure. As shown in FIG. 5, the transmission processing apparatus of the data packet applied to a UE includes: a processing module 52 arranged to carry out the following processing for media plane data to be sent: calling an RTP stack to encapsulate the media plane data to obtain an initial RTP packet, wherein the UE prohibits calling an IP/UDP stack for encapsulating the RTP packet; and a sending module 54 arranged to send the processed media plane data to a base station.

Figure 6:
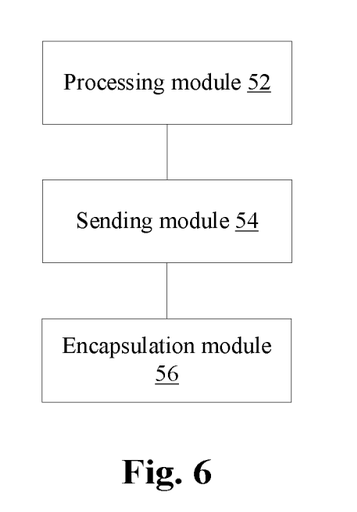
FIG. 6 is a block diagram 2 illustrating the structure of a transmission processing apparatus of a data packet according to an embodiment of the present disclosure.

FIG. 6 is a block diagram 2 illustrating the structure of a transmission processing apparatus of a data packet according to an embodiment of the present disclosure. As shown in FIG. 6, the transmission processing apparatus of the data packet may further include: an encapsulation module 56 arranged to call an LTE protocol stack to encapsulate the RTP packet by adding a PDCP/RLC/MAC header to the RTP packet.

Figure 7:
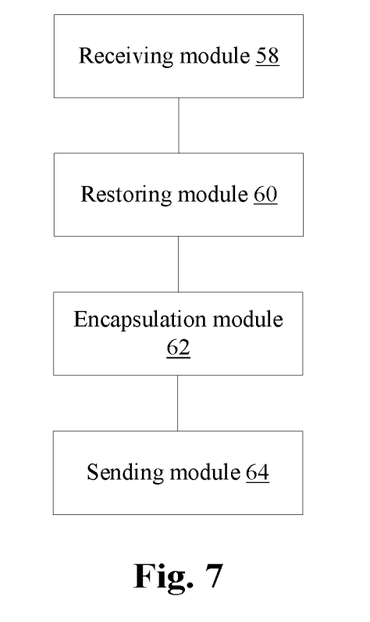
FIG. 7 is a block diagram 3 illustrating the structure of a transmission processing apparatus of a data packet according to an embodiment of the present disclosure.

FIG. 7 is a block diagram 3 illustrating the structure of a transmission processing apparatus of a data packet according to an embodiment of the present disclosure. As shown in FIG. 7, the transmission processing apparatus of the data packet applied to a base station includes: a receiving module 58 arranged to receive media plane data from a UE, wherein the media plane data is data obtained by carrying out the following processing by the UE: calling an RTP stack to encapsulate media plane data to obtain an initial RTP packet; prohibiting calling an IP/UDP stack for encapsulating the RTP packet; and calling an LTE protocol stack to encapsulate the RTP packet again; a restoring module 60 arranged to call the LTE protocol stack to process the media plane data to obtain the initial RTP packet; an encapsulation module 62 arranged to call an IP/UDP protocol to encapsulate the initial RTP packet; and a sending module 64 arranged to send the encapsulated initial RTP packet to a core network.

Figure 8:
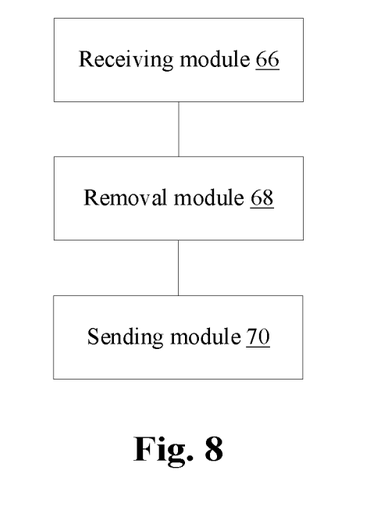
FIG. 8 is a block diagram 4 illustrating the structure of a transmission processing apparatus of a data packet according to an embodiment of the present disclosure.

FIG. 8 is a block diagram 4 illustrating the structure of a transmission processing apparatus of a data packet according to an embodiment of the present disclosure. As shown in FIG. 8, the transmission processing apparatus of the data packet applied to a base station includes: a receiving module 66 arranged to receive a data packet from a core network; a removal module 68 arranged to call an IP/UDP/GTPU stack to remove an IP/UDP/GTPU header; and a sending module 70 arranged to send the data packet with the IP/UDP/GTPU header removed to a UE.

Figure 9:
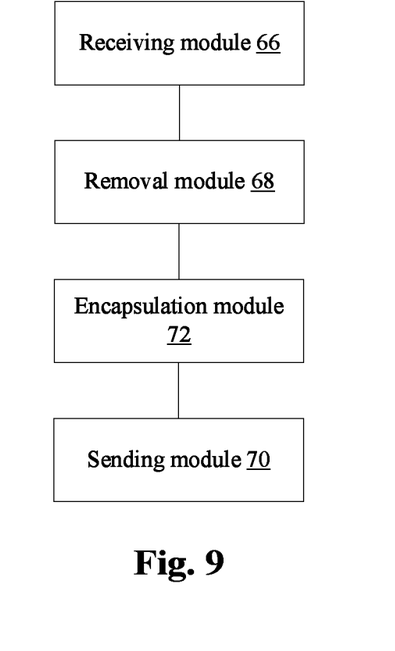
FIG. 9 is a block diagram 5 illustrating the structure of a transmission processing apparatus of a data packet according to an embodiment of the present disclosure.

FIG. 9 is a block diagram 5 illustrating the structure of a transmission processing apparatus of a data packet according to an embodiment of the present disclosure. As shown in FIG. 9, the transmission processing apparatus of the data packet may further include: an encapsulation module 72 arranged to call an LTE protocol stack to encapsulate the data packet with the IP/UDP/GTPU header removed to obtain an encapsulated packet.

In an exemplary embodiment, the encapsulation module 72 is also arranged to call an MAC/RLC/PDCP stack to encapsulate the data packet with the IP/UDP/GTPU header removed.

The technical solution to the foregoing problems existing in the related art is described below in detail with reference to exemplary embodiments and accompanying drawings.

Figure 10:
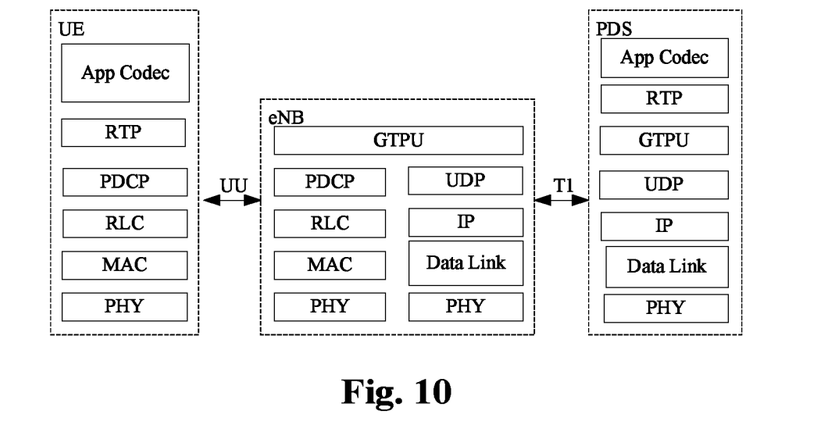
FIG. 10 is a diagram illustrating the structure of the user plane protocol stack of an LTE trunking system according to an embodiment of the present disclosure.

As stated previously, it is inappropriate for an LTE trunking group call to employ ROHC. The exemplary embodiment proposes a solution to reduce the length of the air interface protocol header of the media plane data of an LTE trunking group call. Different from the ROHC of VoLTE, in the present embodiment, instead of compressing the RTP/UDP/IP header, the IP/UDP header of the media plane packet of an air interface is directly removed, while the RTP header is kept. FIG. 10 is a diagram illustrating the structure of the user plane protocol stack of an LTE trunking system according to an embodiment of the present disclosure. Referring to the user plane protocol stack of an LTE trunking system shown in FIG. 10 for details, this processing has the following two advantages.

1) As an IP/UDP header at least occupies 28 bytes, the removal of the IP/UDP header significantly saves precious air interface resources.

2) As an RTP header is kept, disorder adjustment can be carried out for media plane data using the sequence number field contained in the RTP header. Moreover, in the case of the coexistence of voice and video, the voice and the video can be synchronized using the timestamp field contained in the RTP header.

The definition of the abbreviations used in FIG. 10 is elaborated below.

Figure 11:
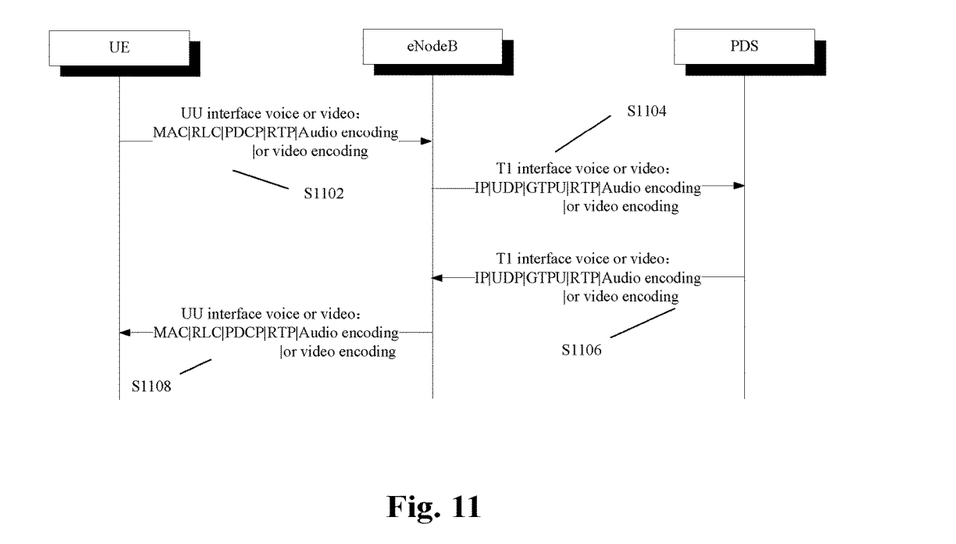
FIG. 11 is a flowchart 1 illustrating the technical flow of an LTE trunking voice (or video) group call according to an embodiment of the present disclosure.

UE: User Equipment, which refers here to trunking terminal
  eNB: E-UTRAN Node B, the base station in LTE
  PDS: PTT Dispatch Server
  PDCP: Packet Data Convergence Protocol
  RLC: Radio link Control protocol
  MAC: Medium Access Control protocol
  PHY: Physical layer
  GTPU: GPRS Tunnel Protocol User Plane FIG. 11 is a flowchart 1 illustrating the technical flow of an LTE trunking voice (or video) group call according to an embodiment of the present disclosure. As shown in FIG. 11, the flow includes the following steps.

S1102:

1) An application layer of a UE (here, a user having a speaking right in a trunking system, that is, a speaking user) calls an RTP stack to add an RTP header to a voice encoding packet (e.g. an ARM frame) or a video encoding packet (e.g. an MPEG frame).

2) The UE delivers an RTP packet to an LTE protocol stack, and the LTE protocol stack respectively adds a PDCP header/an RLC header/an MAC header to the RTP packet.

3) The UE delivers an LTE MAC packet to a physical layer and sends the LTE MAC packet via an air interface.

S1104:

1) A physical layer of an eNB receives the media plane packet from the air interface and delivers the MAC packet to an upper layer.

2) An eNB LTE protocol stack removes the MAC/RLC/PDCP header to obtain an RTP packet.

3) The eNB calls a GTPU/UDP/IP stack to encapsulate the RTP packet.

4) The eNB sends an IP packet to a PDS via a T1 interface.

S1106:

1) After receiving the IP packet from the T1 interface, the PDS removes an IP/UDP/GTPU header from the IP packet to obtain an RTP voice (or video) packet.

2) The PDS calls, according to the eNB pertinent to a called party of the group call, a GTPU/UDP/IP stack to encapsulate the RTP packet.

3) The PDS sends, via the T1 interface, the IP packet to each eNB pertinent to each called party of the group call.

S1108:

1) The eNB receives the IP packet from the T1 interface and calls the IP/UDP/GTPU stack to remove the IP/UDP/GTPU header to obtain the RTP voice (or video) packet.

2) The eNB calls the LTE protocol stack for the RTP voice (or video) packet to encapsulate the MAC/RLC/PDCP header.

3) The eNB sends the MAC packet to an air interface via a physical layer.

A UE (here, a user having no speaking right in a trunking system, that is, a listening user) receives downlink media plane data from an air interface and delivers the downlink media plane data to an upper layer. The UE LTE protocol stack removes an MAC/RLC/PDCP header and delivers the obtained RTP packet to an upper layer. The UE carries out disorder adjustment for voice (or video) packets according to the sequence number field contained in the RTP header and then delivers the adjusted voice (or video) packets to an application layer for decoding.

Figure 12:
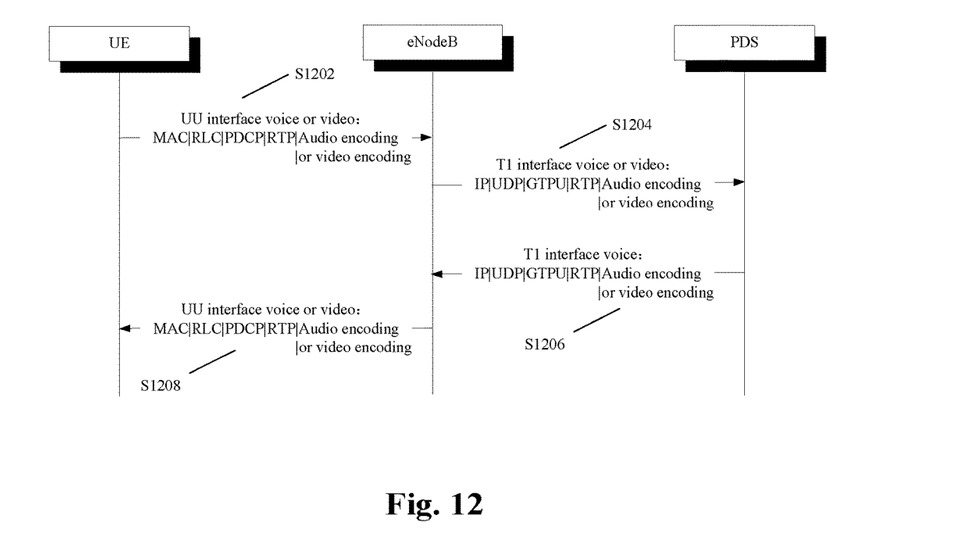
FIG. 12 is a flowchart 2 illustrating the technical flow of an LTE trunking voice (or video) group call according to an embodiment of the present disclosure.

FIG. 12 is a flowchart 2 illustrating the technical flow of an LTE trunking voice (or video) group call according to an embodiment of the present disclosure. As shown in FIG. 12, the flow includes the following steps.

S1202:

1) An application layer of a UE (here, a user having a speaking right in a trunking system, that is, a speaking user) calls an RTP stack to add an RTP header to a voice encoding packet (e.g. an ARM frame) and a video encoding packet (e.g. an MPEG frame).

2) The UE delivers an RTP packet to an LTE protocol stack, and the LTE protocol stack adds a PDCP header/an RLC header/an MAC header to the RTP packet.

3) The UE delivers an LTE MAC packet to a physical layer and sends the LTE MAC packet via an air interface.

S1204:

1) The physical layer of an eNB receives media plane packet from the air interface and delivers the MAC packet to an upper layer.

2) The eNB LTE protocol stack removes the MAC/RLC/PDCP header to obtain the RTP header.

3) The eNB calls a GTPU/UDP/IP stack to encapsulate the RTP packet.

4) The eNB sends an IP packet to a PDS via a T1 interface.

S1206:

1) After receiving the IP packet via the T1 interface, the PDS removes an IP/UDP/GTPU header from the IP packet to obtain an RTP voice and video packet.

2) The PDS calls, according to the eNB pertinent to a called party of a group call, a GTPU/UDP/IP stack to encapsulate the RTP packet.

3) The PDS sends, via the T1 interface, the IP packet to each eNB pertinent to each called party of the group call.

S1208:

1) The eNB receives the IP packet from the T1 interface and calls an IP/UDP/GTPU stack to remove the IP/UDP/GTPU header to obtain the RTP voice and video packet.

2) The eNB calls the LTE protocol stack for the RTP voice and video packet to encapsulate the MAC/RLC/PDCP header.

3) The eNB sends the MAC packet to an air interface via a physical layer.

A UE (here, a user having no speaking right in a trunking system, that is, a listening user) receives downlink media plane data from an air interface and delivers the downlink media plane data to an upper layer. A UE LTE protocol stack removes an MAC header/an RLC header/a PDCP header and delivers the obtained RTP packet to an upper layer. The UE carries out disorder adjustment for voice and video packets according to the sequence number field in an RTP header and then synchronizes voice with a video according to the timestamp field in the RTP header and sequentially delivers the processed packet to an application layer for play.

In conclusion, by removing the IP/UDP header of a media plane packet while keeping an RTP header when the media plane packet is transmitted between a UE and a base station, the technical solution provided by the embodiments of the present disclosure significantly saves precious air interface resources and achieves the disorder adjustment of the media plane packet as well as the voice-video synchronization of the media plane packet.

Apparently, it should be appreciated by those skilled in the art that each module or step described in the present disclosure can be realized by a universal computer and that the modules or steps may be integrated on a single computer or distributed on a network consisting of a plurality of computers, optionally, the modules or steps may be realized by executable program codes so that the modules or steps can be stored in a memory to be executed by a computer, and in some cases, the steps shown or described herein can be executed in a sequence different from this presented herein, or the modules or steps are formed into integrated circuit modules, or several of the modules or steps are formed into integrated circuit modules. Therefore, the present disclosure is not limited to the combination of specific hardware and software.

Although certain exemplary embodiments of the present disclosure have been described above, it should be appreciated that the exemplary embodiments are not described for limiting the present disclosure and that a variety of modifications and variations can be devised by those of ordinary skill in the art. Any modification, equivalent substitute and improvement that can be devised by those of ordinary skill in the art without departing from the principle of the present disclosure and that the modifications and improvements shall fall within the protection scope defined by the appended claims of the present disclosure.

INDUSTRIAL APPLICABILITY

Based on the technical solutions provided in embodiments of the present disclosure, a UE carries out the following processing for media plane data to be sent: calling an RTP stack to encapsulate the media plane data to obtain an initial RTP packet; and prohibiting calling an IP/UDP stack for encapsulating the initial RTP packet; and the UE sends the processed media plane data to a base station. The transmission processing methods and apparatuses of the data packet provided herein address the problem existing in the related art that it is impossible to save air interface resources for transmitting media plane data between a user equipment and a base station and synchronously achieve disorder adjustment and voice-video synchronization of media plane data, thereby saving air interface resources and synchronously achieving disorder adjustment and voice-video synchronization of media plane data.

What is claimed is:

1. A transmission processing method of a data packet, comprising:
    carrying out, by User Equipment (UE), the following processing for media plane data to be sent: calling a Real-time Transport Protocol (RTP) stack to encapsulate the media plane data to obtain an initial RTP packet; and prohibiting, by the UE, calling an Internet Protocol (IP)/User Data Protocol (UDP) stack for encapsulating the initial RTP packet; and
    sending, by the UE, the processed media plane data to a base station.

2. The method as claimed in claim 1, wherein before sending, by the UE, the processed media plane data to the base station, the method further comprises:
    calling a Long Term Evolution (LTE) protocol stack to encapsulate the RTP packet by adding a Packet Data Convergence Protocol (PDCP)/Radio Link Control (RLC)/Multiple Access Control (MAC) header to the RTP packet.

3. A transmission processing method of a data packet, comprising:
    receiving, by a base station, media plane data from User Equipment (UE), wherein the media plane data is data obtained by carrying out the following processing by the UE: calling a Real-time Transport Protocol (RTP) stack to encapsulate media plane data to obtain an initial RTP packet; prohibiting calling an Internet Protocol (IP)/User Data Protocol (UDP) stack for encapsulating the RTP packet; and calling a Long Term Evolution (LTE) stack to encapsulate the RTP packet again;
    calling, by the base station, the LTE protocol stack to process the media plane data to obtain the initial RTP packet;
    calling, by the base station, a GPRS Tunnel Protocol User Plane (GTPU)/UDP/IP protocol to encapsulate the initial RTP packet; and
    sending, by the base station, the encapsulated initial RTP packet to a core network.

4. The method as claimed in claim 3, wherein calling, by the UE, the LTE protocol stack to encapsulate the RTP packet again comprises:
    calling the LTE protocol stack to encapsulate the RTP packet by adding a Packet Data Convergence Protocol (PDCP)/Radio Link Control (RLC)/Multiple Access Control (MAC) header to the RTP packet.

5. The method as claimed in claim 4, wherein calling, by the base station, the LTE protocol stack to process the media plane data to obtain the initial RTP packet comprises:
    calling, by the base station, the LTE protocol stack to remove the MAC/RLC/PDCP header to obtain the initial RTP packet.

6. A transmission processing method of a data packet, comprising:

receiving, by a base station, a data packet from a core network;

calling, by the base station, an Internet Protocol (IP)/User Data Protocol (UDP)/GPRS Tunnel Protocol User Plane (GTPU) stack to remove an IP/UDP/GTPU header; and sending, by the base station, the data packet with the IP/UDP/GTPU header removed to User Equipment (UE).

7. The method as claimed in claim 6, wherein before sending, by the base station, the data packet with the IP/UDP/GTPU header removed to the UE, the method further comprises:

calling, by the base station, a Long Term Evolution (LTE) protocol stack to encapsulate the data packet with the IP/UDP/GTPU header removed to obtain an encapsulated packet.

8. The method as claimed in claim 7, wherein encapsulating, by the base station, the data packet with the IP/UDP/GTPU header removed comprises:

calling, by the base station, a Multiple Access Control (MAC)/Radio Link Control (RLC)/Packet Data Convergence Protocol (PDCP) stack to encapsulate the data packet with the IP/UDP/GTPU header removed.

9. A transmission processing apparatus of a data packet, the transmission processing apparatus being applied to User Equipment (UE), and comprising a hardware processor arranged to execute the following program modules:

a processing module arranged to carry out the following processing for media plane data to be sent: calling a Real-time Transport Protocol (RTP) stack to encapsulate the media plane data to obtain an initial RTP packet; wherein the UE prohibits calling an Internet Protocol (IP)/User Data Protocol (UDP) stack for encapsulating the initial RTP packet; and a sending module arranged to send the processed media plane data to a base station.

10. The apparatus as claimed in claim 9, wherein the hardware processor is further arranged to execute the following program module: an encapsulation module arranged to call a Long Term Evolution (LTE) protocol stack to encapsulate the RTP packet by adding a Packet Data Convergence Protocol (PDCP)/Radio Link Control (RLC)/Multiple Access Control (MAC) header to the RTP packet.

11. A transmission processing apparatus of a data packet, the transmission processing apparatus being applied to a base station, and comprising a hardware processor arranged to execute the following program modules:

a receiving module arranged to receive media plane data from User Equipment (UE), wherein the media plane data is data obtained by carrying out the following processing by the UE: calling a Real-time Transport Protocol (RTP) stack to encapsulate media plane data to obtain an initial RTP packet; prohibiting calling an Internet Protocol (IP)/User Data Protocol (UDP) stack for encapsulating the initial RTP packet; and calling a Long Term Evolution (LTE) protocol stack to encapsulate the RTP packet again;

a restoring module arranged to call the LTE protocol stack to process the media plane data to obtain the initial RTP packet;

an encapsulation module arranged to call an IP/UDP/GPRS Tunnel Protocol User Plane (GTPU) protocol to encapsulate the initial RTP packet; and a sending module arranged to send the encapsulated initial RTP packet to a core network.

12. A transmission processing apparatus of a data packet, the transmission processing apparatus being applied to a base station, and comprising a hardware processor arranged to execute the following program modules:

a receiving module arranged to receive a data packet from a core network;

a removal module arranged to call an Internet Protocol (IP)/User Data Protocol (UDP)/GPRS Tunnel Protocol User Plane (GTPU) stack to remove an IP/UDP/GTPU header; and a sending module arranged to send the data packet with the IP/UDP/GTPU header removed to User Equipment (UE).

13. The apparatus as claimed in claim 12, wherein the hardware processor is further arranged to execute the following program module:

an encapsulation module arranged to call a Long Term Evolution (LTE) protocol stack to encapsulate the data packet with the IP/UDP/GTPU header removed to obtain an encapsulated packet.

14. The apparatus as claimed in claim 13, wherein the encapsulation module is arranged to call a Multiple Access Control (MAC)/Radio Link Control (RLC)/Packet Data Convergence Protocol (PDCP) stack to encapsulate the data packet with the IP/UDP/GTPU header removed.

15. The method as claimed in claim 1, wherein calling the RTP stack to encapsulate the media plane data to obtain the initial RTP packet comprises:

calling, by an application layer of the UE, the RTP stack to add an RTP header to a voice encoding packet or a video encoding packet.

16. The method as claimed in claim 2, wherein sending, by the UE, the processed media plane data to the base station comprises:

delivering, by the UE, an LTE MAC packet to a physical layer and send, by the physical layer, the LTE MAC packet via an air interface.

17. The method as claimed in claim 3, wherein sending, by the base station, the encapsulated initial RTP packet to the core network comprises:

sending, by the base station, an IP packet to a PTT Dispatch Server (PDS) via a T1 interface.

18. The method as claimed in claim 17, wherein after sending, by the base station, the encapsulated initial RTP packet to the core network, the method further comprises:

after receiving the IP packet from the T1 interface, removing, by the PDS, an IP/UDP/GTPU header from the IP packet to obtain an RTP voice or video packet;

calling by the PDS, according to the base station pertinent to a called party of the group call, a GTPU/UDP/IP stack to encapsulate the RTP packet;

sending by the PDS, via the T1 interface, the IP packet to each eNB pertinent to each called party of the group call.

19. The method as claimed in claim 6, wherein receiving, by the base station, the data packet from the core network, calling, by the base station, the IP/UDP/GTPU stack to remove the IP/UDP/GTPU header comprises:

receiving, by the base station, an IP packet from a T1 interface and calling, by the base station, the IP/UDP/GTPU stack to remove the IP/UDP/GTPU header to obtain an RTP voice or video packet.

20. The method as claimed in claim 6, wherein sending, by the base station, the data packet with the IP/UDP/GTPU header removed to the UE comprises:

sending, by the base station, a MAC packet to an air interface via a physical layer.

* * * * *